United States Patent
Aoki et al.

(10) Patent No.: US 9,630,145 B2
(45) Date of Patent: Apr. 25, 2017

(54) CATALYST CONVERTER

(71) Applicants: Yuki Aoki, Nisshin (JP); Hiromasa Suzuki, Toyota (JP); Hiroyuki Matsubara, Gifu (JP)

(72) Inventors: Yuki Aoki, Nisshin (JP); Hiromasa Suzuki, Toyota (JP); Hiroyuki Matsubara, Gifu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 37 days.

(21) Appl. No.: 14/782,060

(22) PCT Filed: Mar. 20, 2014

(86) PCT No.: PCT/IB2014/000399
§ 371 (c)(1),
(2) Date: Oct. 2, 2015

(87) PCT Pub. No.: WO2014/162183
PCT Pub. Date: Oct. 9, 2014

(65) Prior Publication Data
US 2016/0038877 A1   Feb. 11, 2016

(30) Foreign Application Priority Data

Apr. 3, 2013   (JP) ................. 2013-077778

(51) Int. Cl.
| | | |
|---|---|---|
| *B01D 50/00* | (2006.01) | |
| *B01D 53/94* | (2006.01) | |
| *B01J 35/04* | (2006.01) | |
| *C04B 38/00* | (2006.01) | |
| *F01N 3/28* | (2006.01) | |
| *C04B 111/00* | (2006.01) | |

(52) U.S. Cl.
CPC ......... *B01D 53/9431* (2013.01); *B01D 53/94* (2013.01); *B01J 35/04* (2013.01);
(Continued)

(58) Field of Classification Search
CPC ..... F01N 3/28; F01N 3/2882; B01D 53/9431; B01D 2255/1021; B01D 2255/1025; B01D 53/94
(Continued)

(56) References Cited

U.S. PATENT DOCUMENTS

| | | | | |
|---|---|---|---|---|
| 5,108,685 A | * | 4/1992 | Kragle | .................. B28B 3/269 |
| | | | | 264/177.12 |
| 2001/0026838 A1 | * | 10/2001 | Dettling | .................. B01J 23/63 |
| | | | | 427/230 |

(Continued)

FOREIGN PATENT DOCUMENTS

| | | |
|---|---|---|
| DE | 19938038 A1 | 5/2000 |
| EP | 1342889 A1 | 9/2003 |

(Continued)

*Primary Examiner* — Tom P Duong
(74) *Attorney, Agent, or Firm* — Sughrue Mion, PLLC (57) ABSTRACT

A catalyst converter includes: a substrate (1) having a cell structure formed of a center area (1A) having the highest cell density, a peripheral area (1C) having the lowest cell density, and an intermediate area (1B) having the cell density between that of the center area and that of the peripheral area; a first catalyst layer formed in the center area (1A); a second catalyst layer formed in the intermediate area (1B); and a third catalyst layer formed in the peripheral area (1C). A length in a longitudinal direction of the second catalyst layer is longer than that of the first catalyst layer. A length in the longitudinal direction of the third catalyst layer is longer than that of the second catalyst layer. A ratio of the length in the longitudinal direction of the first catalyst layer to the length of the substrate is 65% or more.

2 Claims, 4 Drawing Sheets

(52) U.S. Cl.
CPC ........ *C04B 38/0009* (2013.01); *F01N 3/2803* (2013.01); *F01N 3/2828* (2013.01); *B01D 2255/1021* (2013.01); *B01D 2255/1025* (2013.01); *B01D 2255/9202* (2013.01); *C04B 2111/0081* (2013.01); *F01N 2330/48* (2013.01); *F01N 2330/60* (2013.01); *F01N 2510/0682* (2013.01); *F01N 2510/0684* (2013.01)

(58) Field of Classification Search
USPC .................................. 422/177, 180; 55/523
See application file for complete search history.

(56) References Cited

U.S. PATENT DOCUMENTS

| | | | |
|---|---|---|---|
| 2002/0042344 A1 | 4/2002 | Kondo et al. | |
| 2005/0102987 A1* | 5/2005 | Kudo | B01D 39/2068 55/523 |
| 2007/0196248 A1* | 8/2007 | Mizutani | B01D 46/0063 422/180 |
| 2008/0004174 A1 | 1/2008 | Itoh et al. | |
| 2010/0111796 A1* | 5/2010 | Caudle | B01D 53/9468 423/239.2 |
| 2013/0213000 A1 | 8/2013 | Segawa | |

FOREIGN PATENT DOCUMENTS

| | | |
|---|---|---|
| GB | 2342055 A | 4/2000 |
| JP | 10174866 A | 6/1998 |
| JP | 10-244167 A | 9/1998 |
| JP | 2002-177794 A | 6/2002 |
| JP | 2006-281134 A | 10/2006 |
| JP | 2007-330860 A | 12/2007 |
| JP | 2010-005590 A | 1/2010 |
| JP | 2012-096201 A | 5/2012 |
| WO | 2010/001226 A1 | 1/2010 |

* cited by examiner

DISTANCE FROM CENTER (0) OF SUBSTRATE

FIG. 4

LENGTH OF CATALYST LAYER
IN PERIPHERAL AREA (%)

CATALYST CONVERTER

BACKGROUND OF THE INVENTION

1. Field of the Invention

The present invention relates to a catalyst converter that is housed in and fixed to piping for constituting an exhaust system for exhaust gas.

2. Description of Related Art

Various efforts have been made in various industries worldwide for reduction in environmental impact loads, and particularly, the automotive industry has strived for promotion of so-called eco-friendly cars such as hybrid electric vehicles and electric vehicles as well as gasoline vehicles with superior fuel economy performance and development to aim at further improved performance thereof.

In general, a catalyst converter for purifying exhaust gas is disposed in an exhaust system for exhaust gas that connects a vehicle engine and a muffler.

An engine emits environmentally harmful substances such as CO and NOx as well as unburned HC and VOC, and thus, in order to convert such harmful substances to permissible substances, a catalyst layer that is formed of a noble metal catalyst such as palladium or platinum is formed in a cell wall of a substrate having a number of cells. More specifically, in the cell walls of a number of the cells, the catalyst layer is formed in a longitudinal direction of the substrate that is also a direction in which the exhaust gas flows. When the exhaust gas passes through the catalyst converter having the thus-configured substrate, CO is converted to $CO_2$, NOx is converted to $N_2$ and $O_2$, and VOC is burned to produce $CO_2$ and $H_2O$.

For example, as for the catalyst converter, the cell density of a substrate having cells with a honeycomb structure is generally uniform. However, because flow rate distribution of the exhaust gas in a center area of a cross section of the substrate is higher than that in a peripheral area, this raises a problem of insufficient use of the catalyst layer in the entire substrate. In consideration of such flow rate distribution of the exhaust gas, the catalyst converter is adapted to have the higher cell density in the center area than in the peripheral area of the substrate. Accordingly, it is possible to reduce a difference in the flow rate distribution within the cross section of the substrate as much as possible and thus is possible to purify the exhaust gas by effectively using the catalyst layer of the entire catalyst converter.

Japanese Patent Application Publication No. 2002-177794 (JP 2002-177794 A) discloses a technique to improve exhaust gas purification performance by varying an amount of the noble metal catalyst deposited in a center area (center section herein) from that deposited in a peripheral area (outer peripheral section herein) of a substrate that has a honeycomb structure and whose cell density is uniform in the entire catalyst converter (here, catalyst body). More specifically, of a catalyst body, the amount of the catalyst per unit volume that is deposited in the center section with a large gas flow is set 1.1 times or more of that in the outer peripheral section. However, problems such that it is difficult to expect the high exhaust gas purification performance due to the uniform cell density in the entire catalyst and that a large quantity of hydrogen sulfide that can be a cause of a bad smell is produced in a process of purifying the exhaust gas by increasing the amount of the noble metal catalyst are inherent to this technique.

In addition, Japanese Patent Application Publication No. 2006-281134 (JP 2006-281134 A) discloses a honeycomb structure in which the cell density is reduced from a center area to an outer peripheral area. Accordingly, by varying the cell density within a cross section of the honeycomb structure, it is possible to adjust the flow rate distribution of the exhaust gas to be as uniform as possible within the cross section of the honeycomb structure. However, it has been identified that the simple adjustment of the flow rate distribution to be as uniform as possible by adjusting the cell density just as described does not lead to the efficient use of the entire catalyst layer forming the honeycomb structure during purification of the exhaust gas.

SUMMARY OF THE INVENTION

The present invention provides a catalyst converter that can effectively use an entire catalyst in the catalyst converter for exhaust gas purification and thus has superior exhaust gas purification performance.

An aspect of the present invention relates to a catalyst converter that includes: a substrate having a cell structure that is formed of a center area having the highest cell density, a peripheral area having the lowest cell density, and an intermediate area provided between the center area and the peripheral area and having a cell density between the cell density of the center area and the cell density of the peripheral area; a first catalyst layer that is formed on a cell wall of the center area of the substrate and includes a first noble metal catalyst; a second catalyst layer that is formed on a cell wall of the intermediate area of the substrate and includes a second noble metal catalyst; and a third catalyst layer that is formed on a cell wall of the peripheral area of the substrate and includes a third noble metal catalyst. A length of the second catalyst layer in a longitudinal direction of the substrate is longer than a length of the first catalyst layer in the longitudinal direction, a length of the third catalyst layer in the longitudinal direction is longer than the length of the second catalyst layer in the longitudinal direction, and a ratio of the length of the first catalyst layer in the center area in the longitudinal direction to a length of the substrate in the longitudinal direction is 65% or more. "The first to third catalyst layers" of the present invention mean the thickest portion of the entire catalyst layer in each region respectively. The first to third noble metal catalysts may be the same noble metal catalyst.

In the catalyst converter of the present invention, for example, the substrate having a number of cells is formed of the center area, the intermediate area, and the peripheral area whose cell densities vary from each other, and the center area has the highest cell density while the peripheral area has the lowest cell density. Accordingly, it is possible to reduce a difference in flow rate distribution of exhaust gas among the center area, the intermediate area, and the peripheral area when compared to a substrate having the uniform cell density. Furthermore, as for the lengths in the longitudinal direction (lengths in which the exhaust gas flows in the substrate) of the catalyst layers in the center area, the intermediate area, and the peripheral area, the intermediate area has the longer catalyst layer than the center area does, and the peripheral area has the longer catalyst layer than the intermediate area does. Therefore, the entire catalyst layers that constitute the catalyst converter can effectively be used.

A reason for the above is described as follows. In a vertical cross-sectional view in which the substrate is cut along a cross section in the longitudinal direction, an amount of the exhaust gas that flows into the peripheral area having the relatively low cell density is increased in the substrate whose center area has the relatively high cell density in comparison with a substrate having the uniform cell density per unit volume. As for the length of the each catalyst layer that is formed on the cell wall in the longitudinal direction of the substrate (various ratios are set for the length of the each catalyst layer in the longitudinal direction to the length in the longitudinal direction of the substrate), if the catalyst layer of the conventional substrate having the uniform cell density serving as a reference is applied to the each catalyst layer of the substrate having a different cell density, it is impossible in the peripheral area with the small cell density to obtain sufficient purification performance due to a large amount of the exhaust gas flowing therein (the amount of the exhaust gas to be purified) in comparison with the conventional substrate having the uniform cell density. Considering the above, in addition to that the cell density is varied among the center area, the intermediate area, and the peripheral area, the lengths in the longitudinal direction of the catalyst layers in the intermediate area and the peripheral area are set longer than that in the center area. As a result, contact areas of the catalyst layers in the intermediate area and the peripheral area with the exhaust gas are increased, and the exhaust gas purification performance is thereby improved.

The cell density of the each area can be varied in a mode that the cell density is reduced in a step-wise manner or in a continuous manner in an order of the center area, the intermediate area, and the peripheral area. In addition, not only the one intermediate area but the two or more intermediate areas may be provided. Accordingly, the number of the areas, each of which has a different cell density, may not be 3 but 4 or more.

Furthermore, in the catalyst converter of the present invention, as for the ratio of the catalyst layer, the ratio of the length in the longitudinal direction of the catalyst layer in the center area to the length in the longitudinal direction of the substrate is defined to be 65% or more. Because the ratio of the length of the catalyst layer in the center are to the length of the substrate is defined just as described, the catalyst converter exhibits the superior gas purification performance.

An embodiment of the catalyst layer formed in the cell wall has a two-layer structure including a lower layer on the cell wall side and an upper layer on top thereof, and the each layer is formed of one or more of Pd, Pt, Rh as noble metal catalysts.

In addition to the substrates that are formed of cordierite containing a compound oxide of magnesium oxide, aluminum oxide, and silicon dioxide, and a ceramic material of silicon carbide or the like, the substrate having the cell structure to be used may be formed of a material other than a ceramic material of a metallic material or the like. As for the configuration of the substrate, a so-called honeycomb structure can be applied thereto that includes a number of lattice-shaped cells such as square, hexagon, octagon, or the like.

A ratio of the cell density of the center area to the cell density of the peripheral area may be at least larger than 1 and 2 at most.

The bases for the setting of upper and lower limits of the numerical range are that, if the ratio of the cell density is 1 or lower, the amount of the exhaust gas flowing into the cells in the each area is not sufficiently controlled due to the difference in the cell density between the center area and the peripheral area and that, if the ratio of the cell density exceeds 2, the amount of the exhaust gas flowing into the peripheral area becomes excessive and the purification performance may thereby be degraded.

The catalyst converter of the present invention may' have a cordierite honeycomb carrier with a superior thermal shock resistant property, but it may be an electrically heated converter (EHC) instead. In the EHC, a pair of electrodes is attached to a honeycomb catalyst, is energized to heat the honeycomb catalyst, and thereby enhances the activity of the honeycomb catalyst in order to detoxify the exhaust gas passing therethrough, for example. When applied to an exhaust system for the exhaust gas that connects a vehicle engine and a muffler, the EHC can purify the exhaust gas by the catalyst at a normal temperature. Even when the catalyst is cold, the EHC heats the catalyst electrically for activation and thus can purify the exhaust gas.

As it has been understood from the description above, according to the catalyst converter of the present invention, it is possible to provide a catalyst converter that exhibits the superior exhaust gas purification performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS (Exhaust System of Exhaust Gas) First, an exhaust system of exhaust gas in which a catalyst converter of an embodiment of the present invention is interposed will be outlined. The catalyst converter of the present invention can be applied to the exhaust system of the exhaust gas in which an engine, the catalyst converter, a three-way catalyst converter, a sub-muffler, and a main muffler are disposed and connected to each other by a pipe and in which the exhaust gas produced in the engine flows through each component via the pipe and is then discharged. Next, an embodiment of the catalyst converter will be described below.

Figure 1:
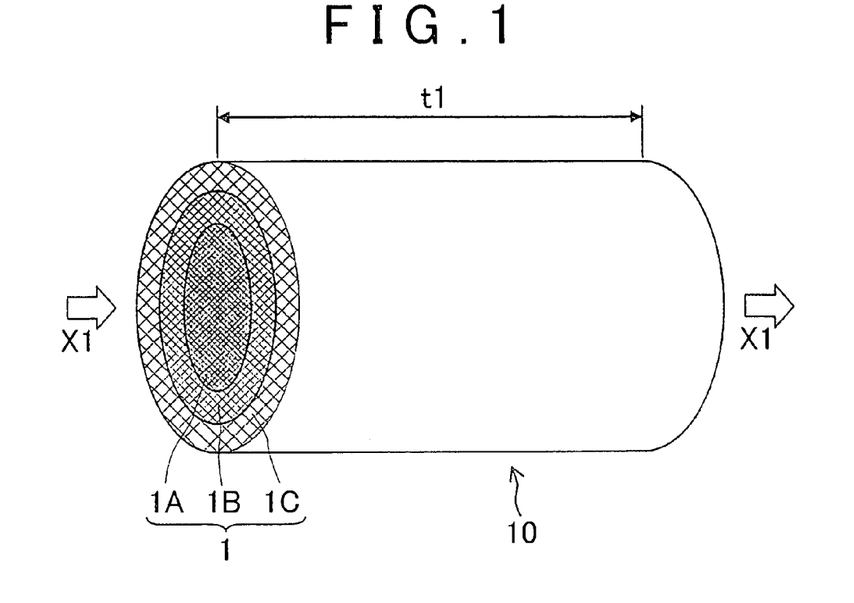
FIG. 1 is a schematic diagram for illustrating an embodiment of a catalyst converter of the present invention.
Figure 2A:
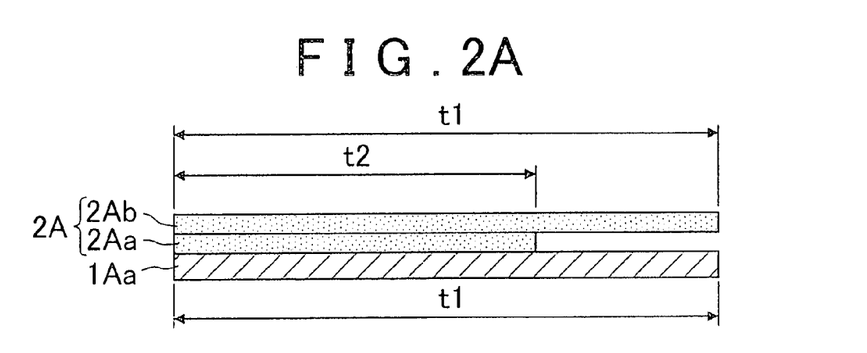
FIG. 2A is a schematic diagram for illustrating a length of a cell wall in a center area of a substrate in a longitudinal direction and lengths of an upper layer and a lower layer of a catalyst layer having a two-layer structure in the longitudinal direction.
Figure 2B:
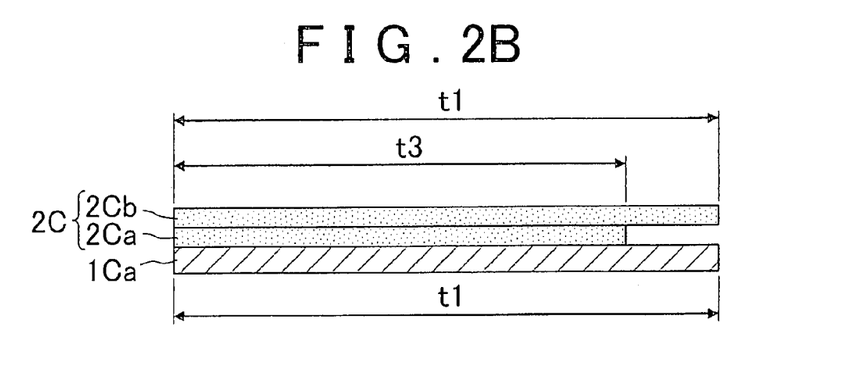
FIG. 2B is a schematic diagram for illustrating a length of the cell wall in a peripheral area in the longitudinal direction and lengths of the upper layer and the lower layer of the catalyst layer having the two-layer structure in the longitudinal direction.
Figure 3:
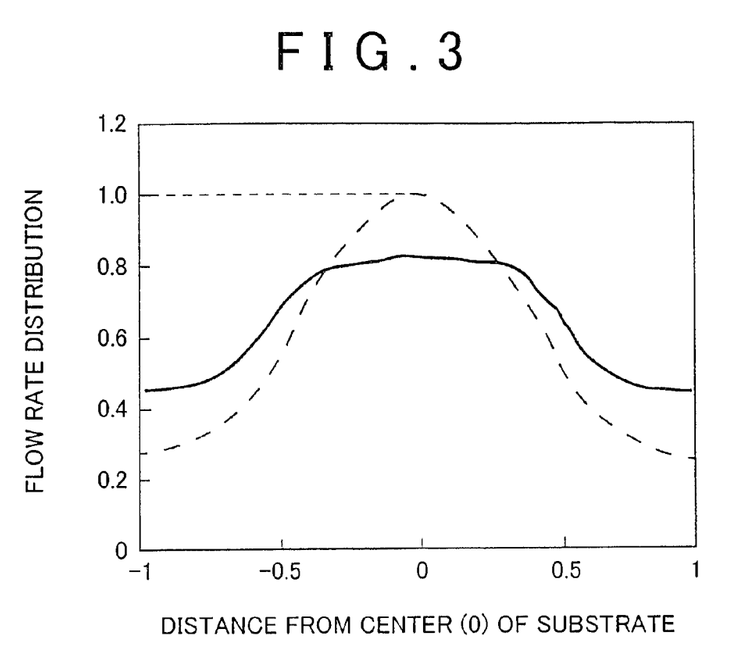
FIG. 3 is a graph for showing flow rate distribution of exhaust gas in a substrate having a uniform cell density and that in a substrate whose cell density is varied between the center area and the peripheral area.

(Embodiment of Catalyst Converter) FIG. 1 is a schematic diagram for illustrating the embodiment of the catalyst converter of the present invention, FIG. 2A is a schematic diagram for illustrating a length of a cell wall in a center area of a substrate in a longitudinal direction and lengths of an upper layer and a lower layer of a catalyst layer having a two-layer structure in the longitudinal direction, and FIG. 2B is a schematic view for illustrating the length of the cell wall in a peripheral area of the substrate in the longitudinal direction and the lengths of the upper layer and the lower layer of the catalyst layer having the two-layer structure in the longitudinal direction. Here, a portion provided with both of the upper layer and the lower layer of the catalyst layer in FIGS. 2A and 2B can be regarded as first and third catalyst layers of the present invention. A portion provided with both of an upper layer and a lower layer of the catalyst layer in an intermediate area 1B of the substrate 1 can be regarded as a second catalyst layer of the present invention. In addition, FIG. 3 shows flow rate distribution of the exhaust gas in a substrate having the uniform cell density and that in the substrate whose cell density is varied between the center area and the peripheral area.

A catalyst converter 10 shown in FIG. 1 is substantially formed of a cylindrical substrate 1 having a number of cells and a catalyst layer having a two-layer structure that is formed in a cell wall for forming cells.

Examples of the materials for the substrate 1 are a ceramic material such as silicon carbide and cordierite that contains a compound oxide of magnesium oxide aluminum oxide and silicon dioxide, and a metallic material or the like. In addition, an example of a carrier that constitutes the catalyst layer formed on the cell wall of the substrate is an oxide that mainly contains at least one of $CeO_2$, $ZrO_2$, $Al_2O_3$ which are porous oxides. For example, the carrier is an oxide that contains any one of ceria ($CeO_2$), zirconia ($ZrO_2$), and alumina ($Al_2O_3$), or a compound oxide containing two or more thereof (a $CeO_2$—$ZrO_2$ compound of a so-called CZ material, a ternary compound oxide of $Al_2O_3$—$CeO_2$—$ZrO_2$ (an ACZ material) to which $Al_2O_3$ is introduced as a diffusion barrier, or the like).

The substrate 1 has a honeycomb structure with a number of lattice-shaped cells such as square, hexagon, or octagon, and the exhaust gas flows through each of the cells (in an X1 direction).

The substrate 1 is formed of three areas of a center area 1A having the highest cell density, an intermediate area 1B having the second highest cell density, and a peripheral area 1C having the lowest cell density.

A description is now made on the flow rate distribution of the exhaust gas with reference to FIG. 3. In the flow rate distribution shown in FIG. 3, two endpoints of a diameter of the substrate having a circular cross section are set to −1, 1 with the center being 0, a position between the endpoints is represented by a ratio to a radius, and a flow rate of the exhaust gas in the each position is represented by a ratio to a flow rate thereof at the center of the substrate in the catalyst converter having the substrate with the uniform cell density.

As shown by a dotted line of FIG. 3, the flow rate distribution of the exhaust gas is substantially higher in the center area of the cross section of the substrate than in the peripheral area in the catalyst converter having the substrate with the uniform cell density. This causes a problem that the catalyst layer of the entire substrate cannot be used sufficiently. On the other hand, the substrate 1 is formed of three regions having different cell densities like the catalyst converter 10 of the embodiment of the present invention, and the cell density of the peripheral area 1C is relatively lowered. Accordingly, as shown by a solid line in FIG. 3, a difference in the flow rate distribution between the center area 1A and the intermediate area 1B of the substrate 1 and further a difference in the flow rate distribution between the center area 1A and the peripheral area 1C can be substantially reduced. Therefore, it is possible to purify the exhaust gas by effectively using the entire catalyst layer included in the catalyst converter 10.

Furthermore, in the illustrated catalyst converter 10, lengths of the catalyst layers that are each formed on the cell wall of each of the peripheral area 1C, the intermediate area 1B, and the center area 1A are set to vary among the areas.

A catalyst layer 2A that is formed on a surface of a cell wall 1Aa of the center area 1A shown in FIG. 2A has a two-layer structure that includes a lower layer 2Aa on the cell wall 1Aa side and an upper layer 2Ab on top thereof that directly contacts the exhaust gas. Each of the layers is formed of one or more of Pd, Pt, Rh as noble metal catalysts. Similarly, a catalyst layer 2C that is formed on a surface of a cell wall 1Ca of the peripheral area 1C shown in FIG. 2B also has the two-layer structure that includes a lower layer 2Ca on the cell wall 1Ca side and an upper layer 2Cb on top thereof. Each of the layers is formed of one or more of Pd, Pt, Rh as the noble metal catalysts. Although it is seen in FIGS. 2A and 2B that the upper layer 2Ab and the upper layer 2Cb do not contact the cell wall 1Aa and the cell wall 1Ca in downstream areas respectively, they actually contact the cell wall 1Aa and the cell wall 1Ca respectively.

When a length of the substrate 1 in the longitudinal direction (a direction in which the exhaust gas flows) is set to t1, lengths of the cell walls 1Aa, 1Ca are also t1. Meanwhile, while lengths of the upper layers 2Ab, 2Cb of the catalyst layers 2A, 2C are t1, lengths of the lower layers 2Aa, 2Ca of the catalyst layers 2A, 2C are respectively t2, t3, and a relationship of t1>t3>t2 is established.

Although not shown, as for a length of the catalyst layer in the intermediate area, an upper one of two layers thereof is set to have a length of t1 that is the same as the lengths of the upper layers 2Ab, 2Cb of the catalyst layers 2A, 2C, while a lower one is set to have a length between t2 and t3 (for example, half a length of a sum of t2 and t3) that are respectively the lengths of the lower layers 2Aa, 2Ca of the catalyst layers 2A, 2C.

Just as described, in addition to that the cell densities are set to vary among the center area 1A, the intermediate area 1B, and the peripheral area 1C, the length of the lower layer of the catalyst layer in the intermediate area is set longer than that of the lower layer 2Aa of the catalyst layer 2A in the center area 1A, and furthermore, the length in the longitudinal direction of the lower layer 2Ca of the catalyst layer 2C in the peripheral area 1C is set longer than that of the lower layer of the catalyst layer in the intermediate area. Accordingly, the favorable exhaust gas purification performance of the catalyst converter 10 can be expected.

In addition, as for the length in the longitudinal direction of the catalyst layer of the center area, a ratio of the length in the longitudinal direction thereof to a total length of the substrate is preferably set to 65% or higher. As for the cell density, the cell density of the center area 1A is preferably set to be at least larger than the cell density of the peripheral area 1C and twice the cell density thereof at most. The bases for the setting of upper and lower limits of the numerical range are that, if the ratio of the cell density is 1 or lower, the amount of the exhaust gas flowing into the cells in the each area is not sufficiently controlled due to the difference in the cell density between the center area 1A and the peripheral area 1C and that, if the ratio of the cell density exceeds 2, the amount of the exhaust gas flowing into the peripheral area 1C becomes excessive and the purification performance may thereby be degraded.

Instead of the two-layer structure shown in FIGS. 2A, 2B, the catalyst layer may have a structure with three or more layers. In addition, the intermediate area 1B may further be divided into two or more areas in a radial direction.

[An experiment to measure NOx emissions when the length of the lower layer of the catalyst layer in the center area (the ratio thereof to the length of the substrate) is set constant and the length of the lower layer of the catalyst layer in the peripheral area is varied, and the result of the experiment]

The inventors conducted an experiment to measure NOx emissions by producing the substrates having the honeycomb structure for examples 1 to 6 and comparative examples 1 to 8 shown below, defining the lengths of the lower layer of the catalyst layer in the center area (the ratio thereof to the length of the substrate) to 50%, 65%, 80%, and 100%, and varying the length of the lower layer of the catalyst layer in the peripheral area (the ratio thereof to the length of the substrate). The length of the lower layer of the catalyst layer in the intermediate area is set to be half the length of the sum of the lengths of the lower layers of the catalyst layers in the center area and the peripheral area. A description will hereinafter be made on the configurations of honeycomb structures 1, 2 applied in this experiment, and specifications of the examples 1 to 6 and the comparative examples 1 to 8 will be shown in a table 1.

(Configuration of Honeycomb Structure 1) A substrate that is made of cordierite and has the honeycomb structure is produced by extrusion molding, and the cell densities thereof are varied among the center area, the intermediate area, and the peripheral area. As for the size of the honeycomb structure, a diameter of a circular cross section that is orthogonal to a flowing direction of the exhaust gas is ϕ103 mm, the length t1 in the longitudinal direction is 105 mm, the cell density of the peripheral area having the lowest cell density is 400 cpsi (62/cm$^2$), the cell density of the intermediate area having the second lowest cell density is 500 cpsi (78/cm$^2$), the cell density of the center area having the largest cell density is 600 cpsi (93/cm$^2$), and the lattice shape of the each cell is square. Furthermore, the each catalyst layer has the two-layer structure, the lower layer thereof is a Pt deposited layer having a deposited amount of 0.1 g/L, and the upper layer is an Rh deposited layer having a deposited amount of 0.3 g/L. As for the length of the each catalyst layer, the length of the upper layer is the same as that of the substrate (the ratio thereof to the length t1 of the substrate is 100%) while the length of the lower layer is varied by area in multiple ways.

(Configuration of Honeycomb Structure 2) There is no distinction of the center area, the intermediate area, and the peripheral area, and the cell density of the entire cross section is uniformly 400 cpsi.

TABLE 1

| Honeycomb structure | | Length of lower layer of catalyst layer in center area (Ratio to length of substrate) (%) | Length of lower layer of catalyst layer in peripheral area (Ratio to length of substrate) (%) |
|---|---|---|---|
| Comparative example 1 | 1 | 50 | 50 |
| Comparative example 2 | 1 | 50 | 65 |
| Comparative example 3 | 1 | 50 | 80 |
| Comparative example 4 | 1 | 50 | 95 |
| Comparative example 5 | 1 | 65 | 50 |
| Example 1 | 1 | 65 | 65 |
| Example 2 | 1 | 65 | 80 |
| Example 3 | 1 | 65 | 95 |
| Comparative example 6 | 1 | 80 | 65 |
| Example 4 | 1 | 80 | 80 |
| Example 5 | 1 | 80 | 95 |
| Comparative example 7 | 2 | 80 | 80 |
| Example 6 | 1 | 100 | 100 |
| Comparative example 8 | 1 | 100 | 80 |

(Experiment Method) A durability test was conducted by running an actual engine for 50 hours in 1-minute cycles of feedback, fuel cut, and rich/lean with a catalyst bed temperature at 950° C. For a method of evaluating the purification performance, the actual engine was used to measure the NOx emission when A/F was reversed from a lean side (15.1) to a rich side (14.1) and a rich atmosphere was retained.

(Experiment Results) The experiment results are shown in FIGS. 4 to 7.

Figure 4:
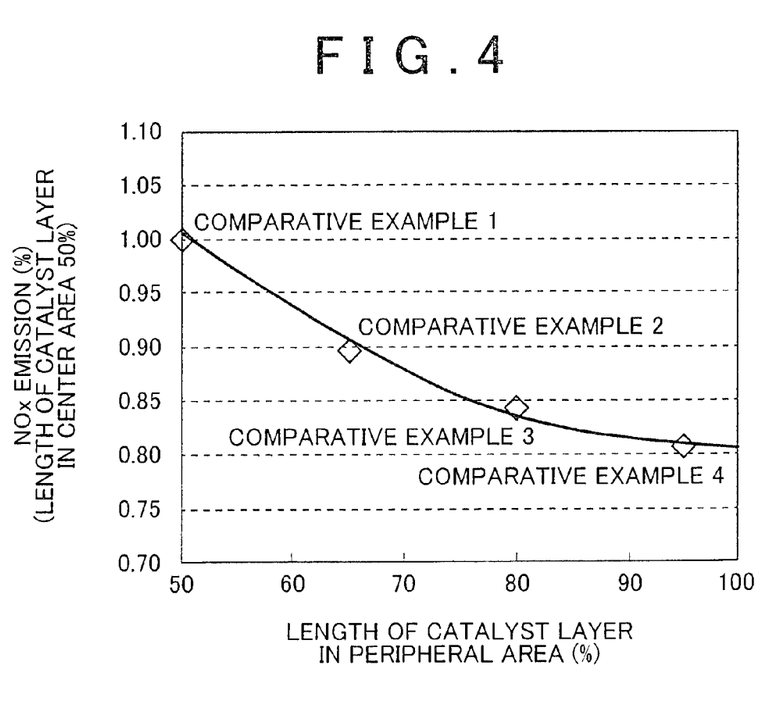
FIG. 4 is a graph for showing a result of an experiment in which NOx emissions are measured when the length of the catalyst layer in the center area (a ratio thereof to a length of the substrate) is 50% and the length of the catalyst layer in the peripheral area is varied.
Figure 5:
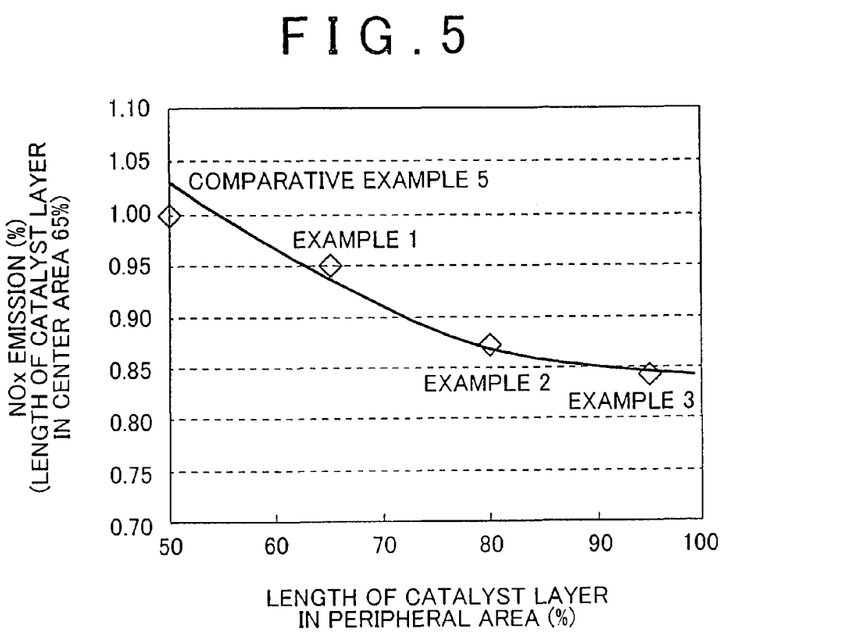
FIG. 5 is a graph for showing a result of an experiment in which the NOx emissions are measured when the length of the catalyst layer in the center area (the ratio thereof to the length of the substrate) is 65% and the length of the catalyst layer in the peripheral area is varied.
Figure 6:
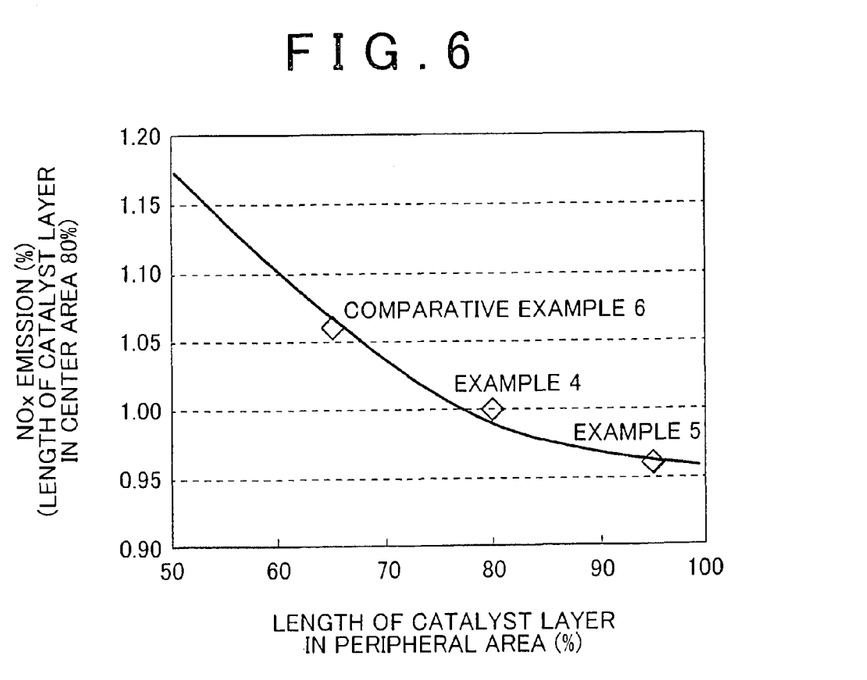
FIG. 6 is a graph for showing a result of an experiment in which the NOx emissions are measured when the length of the catalyst layer in the center area (the ratio thereof to the length of the substrate) is 80% and the length of the catalyst layer in the peripheral area is varied.
Figure 7:
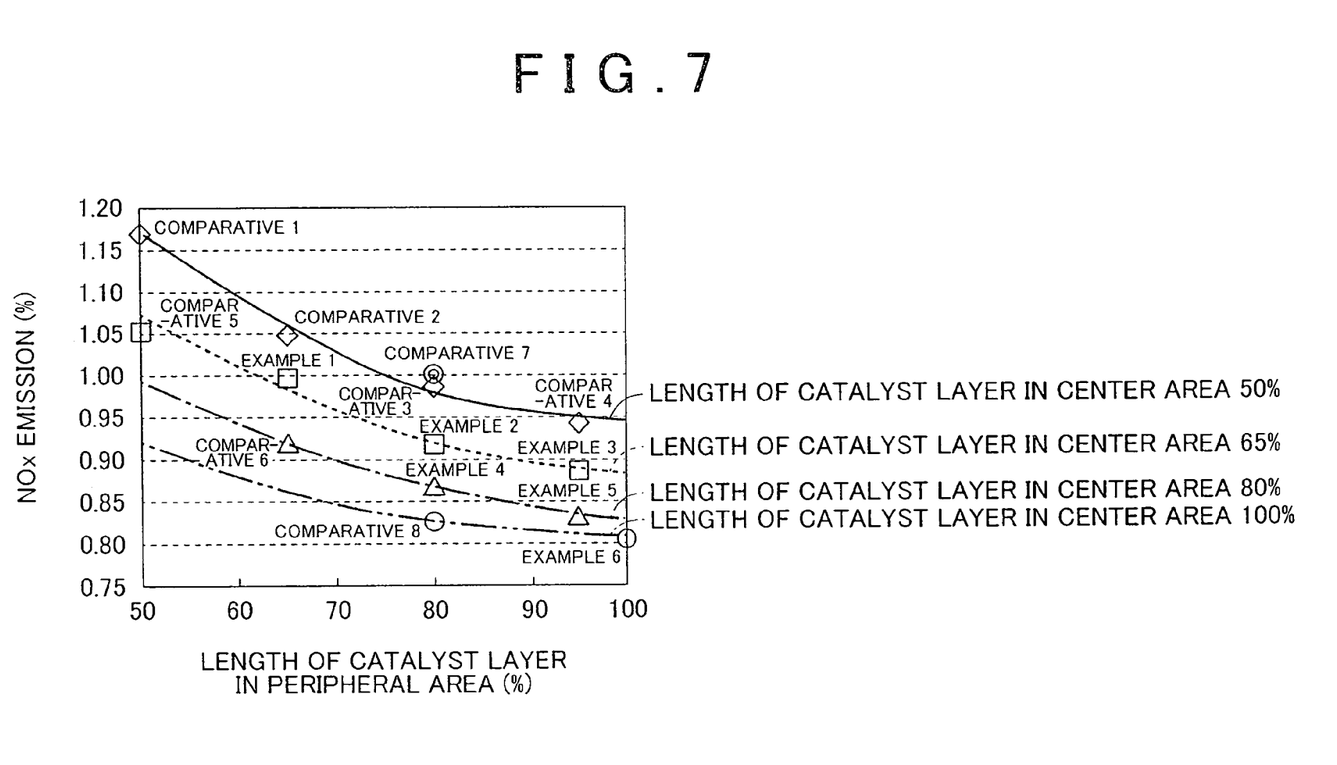
FIG. 7 is a graph for showing a result of an experiment in which the NOx emissions are measured when the lengths of the catalyst layer in the center area (the ratios thereof to the length of the substrate) are 50%, 65%, 80%, and 100% and when the length of the catalyst layer in the peripheral area is varied.

The NOx emissions in the comparative example 1, the comparative example 5, and the comparative example 4 are respectively set as reference values of the measurement results in FIG. 4, FIG. 5, and FIG. 6, and ratios to the reference value are shown in each of the graphs. Furthermore, in FIG. 7 that consolidates all the results, the measurement result of the comparative example 7 in which the specification of the cell cross section is uniform is set as the reference value, and the ratio of the measurement result of the each example and the each comparative example to the reference value is shown.

It can be understood from each of the drawings that the NOx emission is reduced as the length of the lower layer of the catalyst layer in the peripheral area is extended with respect to the length of the lower layer of the catalyst layer in the center area.

The reduction of the NOx emission is particularly remarkable when the length of the lower layer of the catalyst layer in the center area is 65% or more.

Furthermore, it can be understood that the reduction of the NOx emission is also remarkable when the length of the lower layer of the catalyst layer in the peripheral area is equal to or longer than the length of the lower layer of the catalyst layer in the center area (the length of the lower layer of the catalyst layer in the intermediate area is naturally equal to or longer than the length of the lower layer of the catalyst layer in the center area and is equal to or shorter than the length of the lower layer of the catalyst layer in the peripheral area) in each of the cases where the ratios of the length of the lower layer of the catalyst layer in the center area are 65%, 80%, and 100%.

It can be considered from the experiment result that the length of the lower layer of the catalyst layer in the center area is preferably set to 65% or more. It can also be considered that the length of the lower layer of the catalyst layer in the peripheral area is preferably set equal to or longer than the length of the lower layer of the catalyst layer in the center area. More specifically, the length of the lower layer of the catalyst layer in the peripheral area is preferably set to equal to or longer than the length of the lower layer of the catalyst layer in the intermediate area, and the length of the lower layer of the catalyst layer in the intermediate area is preferably set equal to or longer than the length of the lower layer of the catalyst layer in the center area.

The embodiment of the present invention has been described in detail so far with reference to the drawings. However, the specific configuration is not limited to this embodiment, and thus the present invention includes design changes and the like that do not depart from the gist of the present invention. For example, the upper layer of the catalyst layer may be shortened while the lower layer thereof may be extended.

The invention claimed is:

1. A catalyst converter comprising:
a substrate having a cell structure that is formed of a center area having a highest cell density, a peripheral area having a lowest cell density, an intermediate area provided between the center area and the peripheral area and having a cell density between the cell density of the center area and the cell density of the peripheral area;

a first catalyst layer that is formed on a cell wall of the center area of the substrate and includes a first noble metal catalyst;

a second catalyst layer that is formed on a cell wall of the intermediate area of the substrate and includes a second noble metal catalyst; and a third catalyst layer that is formed on a cell wall of the peripheral area of the substrate and includes a third noble metal catalyst;

wherein the first catalyst layer, the second catalyst layer and the third catalyst layer have a two-layer structure that includes a lower layer on a cell wall side and an upper layer that directly contacts an exhaust gas and is provided on the lower layer, respectively, a length of the lower layer of the second catalyst layer in a longitudinal direction of the substrate is longer than a length of the lower layer of the first catalyst layer in the longitudinal direction, a length of the lower layer of the third catalyst layer in the longitudinal direction is longer than the length of the lower layer of the second catalyst layer in the longitudinal direction, and a ratio of the length of the first catalyst layer in the center area in the longitudinal direction to a length of the substrate in the longitudinal direction is 65% or more.

2. The catalyst converter according to claim 1, wherein a ratio of the cell density of the center area to the cell density of the peripheral area is at least larger than 1 and 2 at most.

* * * * *